United States Patent
Sukumaran et al.

(10) Patent No.: US 10,495,014 B2
(45) Date of Patent: Dec. 3, 2019

(54) SYSTEMS AND METHODS FOR DISPLAYING TEST DETAILS OF AN ENGINE CONTROL TEST

(71) Applicant: General Electric Company, Schenectady, NY (US)

(72) Inventors: Suseel Sukumaran, Bangalore (IN); Atul George Tharakan, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 509 days.

(21) Appl. No.: 15/072,455

(22) Filed: Mar. 17, 2016

(65) Prior Publication Data

US 2016/0201591 A1 Jul. 14, 2016

Related U.S. Application Data

(63) Continuation-in-part of application No. 13/723,630, filed on Dec. 21, 2012.
(Continued)

(51) Int. Cl.
*F02D 41/22* (2006.01)
*G01M 15/02* (2006.01)
*F02D 41/28* (2006.01)

(52) U.S. Cl.
CPC .......... *F02D 41/22* (2013.01); *F02D 41/221* (2013.01); *F02D 41/28* (2013.01); *G01M 15/02* (2013.01);
(Continued)

(58) Field of Classification Search
CPC .... F02D 41/22; F02D 41/28; F02D 2041/228; G01M 15/02; Y02T 10/40
(Continued)

(56) References Cited

U.S. PATENT DOCUMENTS 1,579,281 A 4/1926 Coughlin
3,629,801 A 12/1971 Brede
(Continued)

FOREIGN PATENT DOCUMENTS

CN 1109138 A 9/1995
JP 2003191772 A 7/2003
(Continued)

OTHER PUBLICATIONS

"YDS_Operation_Manual_RelevantPortions"; retreived from the internet Apr. 19, 2018; published Feb. 2010; http://www.orebrobildiagnos.se/OBD2/YDS_Operation_Manual.pdf.*
(Continued)

*Primary Examiner* — Sizo B Vilakazi
*Assistant Examiner* — Brian R Kirby
(74) *Attorney, Agent, or Firm* — Christopher R. Carroll; The Small Patent Law Group LLC

(57) ABSTRACT

A system is provided that includes one or more sensors configured to monitor operating parameters of engine components and a controller. The controller is programmed to perform operations that include displaying test details on a display screen that are specific to a selected test to be performed on the engine components. The test details include pre-conditional parameters of the engine components that are necessary prior to starting the selected test. The operations also include receiving the monitored operating parameters of the engine components from the one or more sensors and determining whether the monitored operating parameters satisfy the pre-conditional parameters. The operations further include, responsive to receiving an indication to start the selected test and determining that the measured operating parameters satisfy the pre-conditional parameters, performing the selected test on the engine components.

20 Claims, 10 Drawing Sheets

Related U.S. Application Data

(60) Provisional application No. 61/581,425, filed on Dec. 29, 2011.

(52) U.S. Cl.
CPC ......... *F02D 2041/228* (2013.01); *Y02T 10/40* (2013.01)

(58) Field of Classification Search
USPC ................ 701/114, 34.4; 73/114.01, 114.77
See application file for complete search history.

(56) References Cited

U.S. PATENT DOCUMENTS

| | | | |
|---|---|---|---|
| 3,893,108 A | 7/1975 | McBride, Jr. et al. | |
| 4,019,489 A | 4/1977 | Cartmill | |
| 4,122,720 A | 10/1978 | Podl | |
| 4,136,286 A | 1/1979 | O Halloran et al. | |
| 4,296,409 A | 10/1981 | Whitaker et al. | |
| 4,399,513 A | 8/1983 | Sullivan et al. | |
| 4,429,670 A | 2/1984 | Ulanet | |
| 4,467,323 A * | 8/1984 | Kling .................... | G01M 15/02 345/24 |
| 4,603,394 A | 7/1986 | Bukowski et al. | |
| 4,653,445 A | 3/1987 | Book et al. | |
| 4,843,575 A | 6/1989 | Crane | |
| 4,861,291 A | 8/1989 | Koike | |
| 4,924,418 A | 5/1990 | Bachman et al. | |
| 4,926,331 A | 5/1990 | Windle et al. | |
| 5,043,727 A | 8/1991 | Ito | |
| 5,070,832 A | 12/1991 | Hapka et al. | |
| 5,374,917 A | 12/1994 | Hoffman et al. | |
| 5,428,555 A | 6/1995 | Starkey et al. | |
| 5,446,665 A | 8/1995 | Adrian et al. | |
| 5,523,948 A | 6/1996 | Adrain | |
| 5,803,043 A | 9/1998 | Bayron et al. | |
| 5,828,977 A | 10/1998 | Hayashi et al. | |
| 5,884,210 A | 3/1999 | Rettig et al. | |
| 6,067,489 A | 5/2000 | Letang et al. | |
| 6,131,539 A | 10/2000 | Thomas | |
| 6,141,628 A | 10/2000 | Worth et al. | |
| 6,169,953 B1 | 1/2001 | Panoushek et al. | |
| 6,172,428 B1 * | 1/2001 | Jordan .................. | H02P 9/04 290/40 C |
| 6,192,321 B1 * | 2/2001 | Grumstrup ............ | G05B 21/02 137/1 |
| 6,259,981 B1 | 7/2001 | Wilcosky | |
| 6,269,300 B1 | 7/2001 | Moore-McKee et al. | |
| 6,304,814 B1 | 10/2001 | Masters et al. | |
| 6,351,692 B1 | 2/2002 | Eaton et al. | |
| 6,421,572 B1 | 7/2002 | Koyama et al. | |
| 6,441,726 B1 | 8/2002 | Voto et al. | |
| 6,512,974 B2 | 1/2003 | Houston et al. | |
| 6,525,664 B1 | 2/2003 | Erland | |
| 6,530,359 B1 | 3/2003 | Steffen | |
| 6,535,811 B1 | 3/2003 | Rowland et al. | |
| 6,560,528 B1 | 5/2003 | Gitlin et al. | |
| 6,615,160 B1 * | 9/2003 | Quinnett ................ | F01P 3/12 123/361 |
| 6,757,606 B1 | 6/2004 | Gonring | |
| 6,782,313 B1 | 8/2004 | Frech et al. | |
| 6,801,849 B2 * | 10/2004 | Szukala ................ | G01M 15/05 701/114 |
| 6,928,362 B2 | 8/2005 | Meaney | |
| 6,941,176 B2 | 9/2005 | Kamihira et al. | |
| 7,047,114 B1 | 5/2006 | Rogers | |
| 7,051,692 B1 | 5/2006 | Powers | |
| 7,116,216 B2 | 10/2006 | Andreasen et al. | |
| 7,143,363 B1 | 11/2006 | Gaynor et al. | |
| 7,177,734 B2 | 2/2007 | Fossen et al. | |
| 7,182,064 B2 | 2/2007 | Dolker et al. | |
| 7,216,052 B2 * | 5/2007 | Fountain .............. | G06F 11/263 702/119 |
| 7,272,483 B2 | 9/2007 | Boenker et al. | |
| 7,330,133 B2 | 2/2008 | Kawanishi et al. | |
| 7,349,794 B2 | 3/2008 | Malone et al. | |
| 7,361,067 B1 | 4/2008 | Smedema | |
| 7,441,189 B2 | 10/2008 | Michaels | |
| 7,472,684 B1 | 1/2009 | McKee et al. | |
| 7,490,584 B1 | 2/2009 | White | |
| 7,496,434 B2 | 2/2009 | Fossen et al. | |
| 7,550,117 B2 | 6/2009 | Alward et al. | |
| 7,572,416 B2 | 8/2009 | Alward et al. | |
| 7,593,784 B2 | 9/2009 | Carle et al. | |
| 7,643,916 B2 * | 1/2010 | Underdal ............... | G06N 5/022 701/31.4 |
| 7,693,649 B2 | 4/2010 | Groer et al. | |
| 7,715,959 B2 * | 5/2010 | Silvester ............. | B60R 16/0232 701/33.8 |
| 7,726,279 B2 | 6/2010 | Okuyama et al. | |
| 7,785,544 B2 | 8/2010 | Alward et al. | |
| 7,786,851 B2 | 8/2010 | Drew et al. | |
| 7,854,681 B2 | 12/2010 | Sopko et al. | |
| 7,980,905 B2 * | 7/2011 | Rembach ............... | B63H 21/20 440/6 |
| 8,103,425 B2 | 1/2012 | Choi et al. | |
| 8,160,767 B1 * | 4/2012 | Thompson ........... | G07C 5/0808 701/29.1 |
| 8,180,507 B2 | 5/2012 | Dokken | |
| 8,295,993 B2 | 10/2012 | Kumar | |
| 8,398,405 B2 | 3/2013 | Kumar | |
| D681,049 S | 4/2013 | Freiberger | |
| D681,649 S | 5/2013 | Fletcher et al. | |
| D681,651 S | 5/2013 | Fletcher et al. | |
| D684,173 S | 6/2013 | Rytt et al. | |
| D687,838 S | 8/2013 | Poeppel et al. | |
| D692,912 S | 11/2013 | Pearcy et al. | |
| 8,598,103 B2 | 12/2013 | Carey et al. | |
| 8,620,461 B2 | 12/2013 | Kihas | |
| 8,642,523 B2 | 2/2014 | Crouthamel et al. | |
| D705,242 S | 5/2014 | Bohmfalk et al. | |
| D705,798 S | 5/2014 | Lim et al. | |
| 8,728,999 B2 | 5/2014 | Carey et al. | |
| 8,759,267 B2 | 6/2014 | Tellier et al. | |
| D709,905 S | 7/2014 | Bohmfalk et al. | |
| D710,368 S | 8/2014 | Amaitis et al. | |
| D714,339 S | 9/2014 | Hendrickson et al. | |
| D719,963 S | 12/2014 | Hobbs et al. | |
| D720,767 S | 1/2015 | Miller et al. | |
| D723,055 S | 2/2015 | Francisco et al. | |
| 8,998,617 B2 | 4/2015 | Kumar | |
| D753,684 S | 4/2016 | Rahn et al. | |
| D754,696 S | 4/2016 | Follett et al. | |
| D757,762 S | 5/2016 | Guesnon, Jr. et al. | |
| 9,342,983 B1 | 5/2016 | Brener et al. | |
| D759,059 S | 6/2016 | Looney et al. | |
| D759,675 S | 6/2016 | Looney et al. | |
| D765,090 S | 8/2016 | Yang et al. | |
| D766,258 S | 9/2016 | Wang et al. | |
| D766,264 S | 9/2016 | Kahn et al. | |
| D766,916 S | 9/2016 | Bertnick et al. | |
| D766,940 S | 9/2016 | Napper et al. | |
| D769,287 S | 10/2016 | Lirov et al. | |
| D771,079 S | 11/2016 | Nadiadi et al. | |
| D772,245 S | 11/2016 | Mandawat et al. | |
| D773,532 S | 12/2016 | Gauci et al. | |
| D774,521 S | 12/2016 | Amin | |
| D775,142 S | 12/2016 | Leise | |
| D775,635 S | 1/2017 | Raji et al. | |
| D776,136 S | 1/2017 | Chen et al. | |
| D777,177 S | 1/2017 | Chen et al. | |
| D778,284 S | 2/2017 | Dahlen | |
| D778,300 S | 2/2017 | Binder et al. | |
| D778,935 S | 2/2017 | Scheepers et al. | |
| D780,190 S | 2/2017 | Kothe et al. | |
| D780,194 S | 2/2017 | Saeed et al. | |
| D781,303 S | 3/2017 | Lukanuski et al. | |
| D781,304 S | 3/2017 | Pigg et al. | |
| D781,307 S | 3/2017 | Austin et al. | |
| D781,308 S | 3/2017 | Austin et al. | |
| D783,027 S | 4/2017 | Saeed et al. | |
| D784,377 S | 4/2017 | Paul et al. | |
| D785,016 S | 4/2017 | Berwick et al. | |

(56) References Cited

U.S. PATENT DOCUMENTS

| | | | |
|---|---|---|---|
| D785,021 S | 4/2017 | Meegan et al. | |
| D786,281 S | 5/2017 | Gedrich et al. | |
| D788,792 S | 6/2017 | Alessandri et al. | |
| 2001/0027070 A1 | 10/2001 | Morris et al. | |
| 2002/0069011 A1 | 6/2002 | Hawkins et al. | |
| 2003/0182085 A1* | 9/2003 | Quinnett | F01P 3/12 702/185 |
| 2003/0216856 A1* | 11/2003 | Jacobson | F02B 37/00 701/114 |
| 2004/0002810 A1* | 1/2004 | Akuzawa | F02D 41/22 701/114 |
| 2004/0084014 A1 | 5/2004 | Hawkins et al. | |
| 2004/0107039 A1 | 6/2004 | Hasler et al. | |
| 2004/0199324 A1* | 10/2004 | Li | F01P 11/14 701/114 |
| 2004/0205700 A1 | 10/2004 | Leu et al. | |
| 2004/0267438 A1* | 12/2004 | Boysen | F02M 65/00 701/114 |
| 2005/0042151 A1 | 2/2005 | Alward et al. | |
| 2005/0258948 A1* | 11/2005 | Bolander | B60Q 11/00 340/438 |
| 2006/0015244 A1 | 1/2006 | Hawkins et al. | |
| 2006/0058929 A1* | 3/2006 | Fossen | B63B 9/001 701/21 |
| 2006/0106510 A1 | 5/2006 | Heffington | |
| 2006/0116796 A1* | 6/2006 | Fossen | G05B 23/0256 701/21 |
| 2006/0176193 A1 | 8/2006 | Wraight | |
| 2006/0288701 A1 | 12/2006 | Ramamurthy et al. | |
| 2007/0162216 A1 | 7/2007 | Choi et al. | |
| 2007/0250227 A1 | 10/2007 | Fossen et al. | |
| 2008/0060598 A1 | 3/2008 | Dobeck | |
| 2008/0112865 A1 | 5/2008 | Alward et al. | |
| 2008/0171650 A1 | 7/2008 | Alward et al. | |
| 2008/0269011 A1 | 10/2008 | Sopko et al. | |
| 2008/0312775 A1 | 12/2008 | Kumar | |
| 2009/0079399 A1 | 3/2009 | Ganev et al. | |
| 2009/0156068 A1 | 6/2009 | Barrett et al. | |
| 2009/0184812 A1 | 7/2009 | Drew et al. | |
| 2009/0186325 A1 | 7/2009 | Kumar | |
| 2009/0187297 A1 | 7/2009 | Kish et al. | |
| 2009/0222155 A1 | 9/2009 | Alston et al. | |
| 2009/0240391 A1 | 9/2009 | Duddle et al. | |
| 2009/0271054 A1 | 10/2009 | Dokken | |
| 2009/0274602 A1 | 11/2009 | Alward et al. | |
| 2010/0094490 A1 | 4/2010 | Alston et al. | |
| 2010/0106350 A1 | 4/2010 | Alston | |
| 2010/0125383 A1 | 5/2010 | Caouette | |
| 2010/0131150 A1 | 5/2010 | Knapp et al. | |
| 2010/0204898 A1 | 8/2010 | Wyatt et al. | |
| 2011/0023822 A1 | 2/2011 | Spivak | |
| 2011/0195618 A1 | 8/2011 | Arbuckle et al. | |
| 2011/0195878 A1 | 8/2011 | Tellier et al. | |
| 2011/0195882 A1 | 8/2011 | Carey et al. | |
| 2011/0195884 A1 | 8/2011 | Crouthamel et al. | |
| 2011/0207639 A1 | 8/2011 | Carey et al. | |
| 2012/0029876 A1 | 2/2012 | Saitoh et al. | |
| 2013/0171590 A1 | 7/2013 | Kumar | |
| 2014/0152469 A1 | 6/2014 | Davito et al. | |
| 2015/0149074 A1 | 5/2015 | Lepisto et al. | |
| 2016/0117657 A1 | 4/2016 | Forbes, Jr. et al. | |
| 2016/0203569 A1 | 7/2016 | Forbes, Jr. et al. | |

FOREIGN PATENT DOCUMENTS

| | | |
|---|---|---|
| JP | 2010224893 A | 10/2010 |
| JP | 2011080968 A | 4/2011 |
| WO | 2004059411 A1 | 7/2004 |
| WO | 2005077754 A1 | 8/2005 |
| WO | 2005113126 A1 | 12/2005 |
| WO | 2007084242 A1 | 7/2007 |
| WO | 2008031880 A2 | 3/2008 |
| WO | 2008133782 A1 | 11/2008 |
| WO | 2008134251 A2 | 11/2008 |
| WO | 2009109702 A1 | 9/2009 |
| WO | 2009133399 A2 | 11/2009 |
| WO | 2011094562 A1 | 8/2011 |
| WO | 2011094571 A1 | 8/2011 |
| WO | 2011094575 A1 | 8/2011 |
| WO | 2011094582 A1 | 8/2011 |

OTHER PUBLICATIONS

"4SDS_UserGuideVersion4.00", retreived from the internet Dec. 10, 2018; published Jan. 2001; http://www.marineengine.com/parts/technical_information/omc_5033251.pdf (Year: 2001).*

"YDS_Operation_Manual_RelevantPortions"; retreived from the internet Apr. 19, 2018; published Feb. 2010; http://www.orebrobildiagnos.se/OBD2/YDS_Operation_Manual.pdf (Year: 2010).*

"Kongsberg K-Cheif Marine Automation", Kongsberg Maritime, pp. 1-16, Oct. 2005.

"Kongsberg K-Cheif 500 Alarm and Monitoring System with Process Control and Power Management", Kongsberg Maritime, pp. 1-422, Published on Mar. 2009.

U.S. Restriction Requirement issued in connection with related U.S. Appl. No. 29/554,797 dated Mar. 31, 2017.

U.S. Notice of Allowance issued in connection with related U.S. Appl. No. 29/554,797 dated Jun. 6, 2017.

Unofficial English Translation of Japanese Office Action issued in connection with Related JP Application No. 2014550407 dated Nov. 4, 2015.

Unofficial English Translation of Japanese Office Action issued in connection with Related JP Application No. 2014550407 dated Apr. 26, 2016.

Examination Report for related IN Application No. 5204/CHENP/2014 dated Jan. 14, 2019 (5 pages).

* cited by examiner

SYSTEMS AND METHODS FOR DISPLAYING TEST DETAILS OF AN ENGINE CONTROL TEST

CROSS-REFERENCE TO RELATED APPLICATIONS

This application is a continuation-in-part of U.S. application Ser. No. 13/723,630, filed Dec. 21, 2012, which claims priority to U.S. Provisional Application No. 61/581,425, filed Dec. 29, 2011, both of which are incorporated by reference herein in their entireties.

FIELD

Embodiments of the subject matter disclosed herein relate to displaying test details of an engine control test of a power-generating system.

BACKGROUND

Various vehicle systems and industrial machinery have engine control units that control engine components affiliated with power generation. The engine components may include engines, motors, pumps, turbochargers, alternators, radiators, and other devices or machines. The engine control unit may run tests on the engine components in order to ensure that the engine components are operating properly, such as within designated safety and performance standards. Some tests may be run periodically as a health check, and other tests may be run at specific times, such as when a replacement engine component has been installed in the power generation system. In the context of a rail vehicle, the engine control unit may be located on a locomotive and may control components that generate power for motoring efforts of the locomotive as well as for auxiliary loads, such as heating, ventilation, and air-conditioning (HVAC) systems, lighting, and the like. Alternatively, in the context of a marine vessel, the engine control unit may be located on a marine propulsion vessel and may control components that generate power for motoring efforts (e.g., driving an engine shaft, spinning a turbine, powering a generator, etc.) of the propulsion vessel as well as for auxiliary loads.

Various different tests may be performed by the engine control unit based on a prompt from an operator. In known engine control units, a display of the engine control unit provides very limited information to an operator regarding the tests. For example, the display may only provide a title or name of the tests, with no additional details about the tests such as the purpose for each test, the pre-requisites necessary in order to perform the test, the engine components that are manipulated during the test, and the expectations during the test (e.g., what alarms to expect and/or how the affected engine components are projected to be operated). Furthermore, some engine control units only display the titles of certain tests that are available to be performed under the current operating conditions of the power-generating system. Therefore, if the current operating conditions do not satisfy the pre-requisites for a given test, then the title of that test is not displayed to the operator and not accessible for selection. Since test information is so limited, an operator that desires to run a specific test would have to consult an outside resource, such as a hard copy test manual, in order to ascertain information about the tests. However, hard copy test manuals are inefficient as the manuals cannot tailor the way that information is presented to an operator in order to make relevant information more easily accessible. Furthermore, hard copy manuals cannot provide information that is specific to the current operations of the engine components. Additionally, the hard copy manuals can be misplaced, damaged over time, and/or outdated.

BRIEF DESCRIPTION

In an embodiment, a system (e.g., an engine control system) is provided that includes one or more sensors and a controller. The one or more sensors are configured to monitor operating parameters of one or more engine components. The controller has one or more processors. The controller is operatively connected to the one or more sensors and the one or more engine components. The controller is programmed to perform operations in response to instructions stored on a non-transitory memory. The operations include displaying test details on a display screen. The test details are specific to a selected test for the controller to perform on the one or more engine components. The test details include pre-conditional parameters of the one or more engine components that are necessary prior to starting the selected test. The operations also include receiving the monitored operating parameters of the one or more engine components from the one or more sensors, and determining whether the monitored operating parameters satisfy the pre-conditional parameters. The operations further include, responsive to both receiving an indication to start the selected test and determining that the measured operating parameters satisfy the pre-conditional parameters, performing the selected test on the one or more engine components.

In another embodiment, a method (e.g., for testing an engine) is provided that includes displaying test details on a display screen. The test details are specific to a selected test for performance on one or more engine components. The test details include pre-conditional parameters of the one or more engine components that are necessary prior to starting the selected test. The method also includes receiving monitored operating parameters of the one or more engine components from one or more sensors, and determining, using one or more processors, whether the monitored operating parameters satisfy the pre-conditional parameters. The method further includes, responsive to both receiving an indication to start the selected test and determining that the monitored operating parameters satisfy the pre-conditional parameters, performing the selected test on the one or more engine components.

In another embodiment, a tangible and non-transitory computer readable medium is provided that includes one or more computer software modules configured to direct one or more processors to display test details on a display screen. The test details are specific to a selected test for performance on one or more engine components. The test details include pre-conditional parameters of the one or more engine components that are necessary prior to starting the selected test. The one or more computer software modules are also configured to direct one or more processors to receive monitored operating parameters of the one or more engine components from one or more sensors, and to determine whether the measured operating parameters satisfy the pre-conditional parameters. The one or more computer software modules are further configured to direct one or more processors to perform the selected test on the one or more engine components responsive to both receiving an indication to start the selected test and determining that the measured operating parameters satisfy the pre-conditional parameters.

BRIEF DESCRIPTION OF THE DRAWINGS

The present inventive subject matter will be better understood from reading the following description of non-limiting embodiments, with reference to the attached drawings, in which.

DETAILED DESCRIPTION

Figure 1:
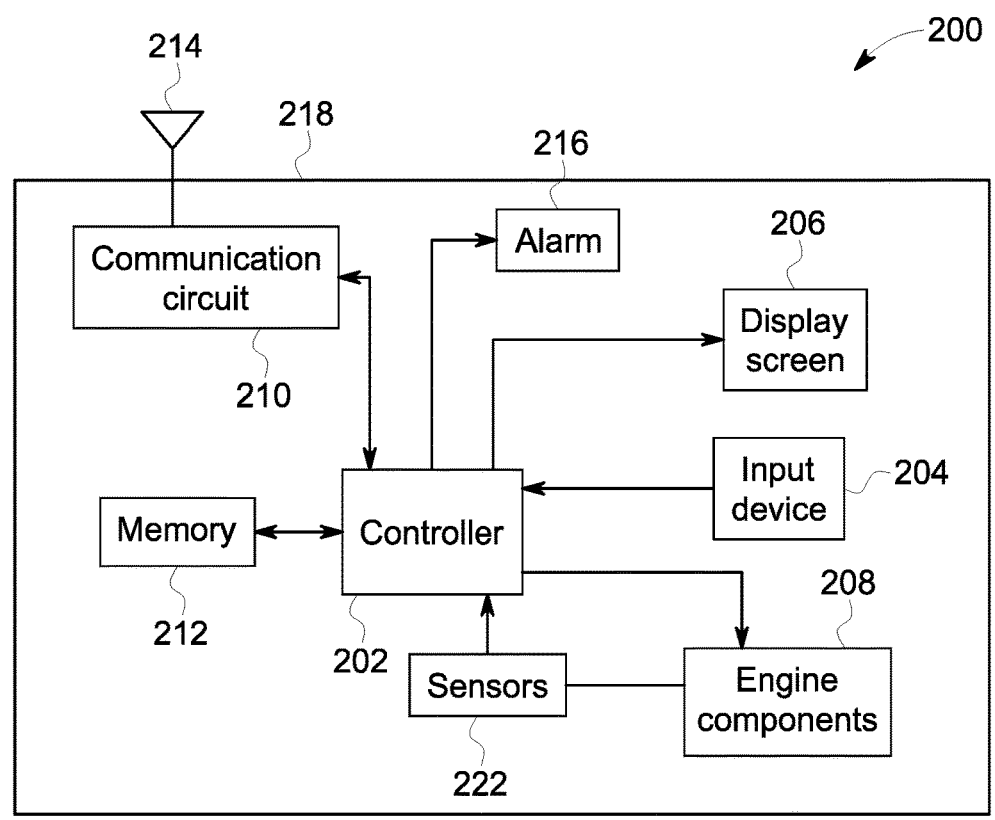
FIG. 1 is a schematic diagram of an engine control system according to an embodiment.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system," "device," or "unit" may include a hardware and/or software system that operates to perform one or more functions. For example, a unit, device, or system may include a computer processor, controller, or other logic-based device that performs operations based on instructions stored on a tangible and non-transitory computer readable storage medium, such as a computer memory. Alternatively, a unit, device, or system may include a hard-wired device that performs operations based on hard-wired logic of the device. The units, devices, or systems shown in the attached figures may represent the hardware that operates based on software or hardwired instructions, the software that directs hardware to perform the operations, or a combination thereof. The systems, devices, or units can include or represent hardware circuits or circuitry that include and/or are connected with one or more processors, such as one or computer microprocessors.

Various embodiments described herein provide test details for performing tests on a power-generating system. The test details are presented as a part of a graphical user interface (GUI), such as a computational functional display (CFD), shown on a display. The CFD described herein provides a structured way for executing various tests from a human machine interface (HMI) or operator-controlled input device. In the CFD, similar tests may be grouped together in categories in order to allow an operator to quickly access a specific test. The test details include information about pre-requisites (e.g., specific conditions) for running the tests. All of the pre-requisites for a given test may need to be satisfied before the test is able to be performed or run. The test details also may include information about the status and/or signals of a given test prior to and/or during the performance of the given test. Thus, the test details may provide an operator, prior to the test, details of what to expect during the test (e.g., what engine components are going to be adjusted and how, what alerts are going to be activated, etc.). During the performance of the test, the CFD may be updated to provide information about the current status or activity that is occurring (e.g., which test is being performed if multiple are scheduled, the stage of the test, an identification of any alerts that are currently activated, etc.).

An engine controller or control unit may run a sequence of tests on the power-generating system, and the CFD may provide test details both prior to and during the performance of the tests. The engine controller also may record test data that is collected during a test. The test data may be recorded automatically or upon receiving an operator input to record test data. The test data may be provided to the operator and/or a remote device after the test for analysis. In various embodiments, the engine controller can perform complex tasks (e.g., running various tests on engine components and collecting data related to the tests), while providing on-screen instructions and other information to an operator via the CFD. The engine controller can reduce the burden on operators, such as field engineers. For example, the test details provided on the CFD of the engine controller may be more up-to-date, more easily accessible, better tailored to the relevant engine components, and altogether more informative than information found in a hard copy test manual.

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not therefore to be considered to be limiting of its scope. Wherever possible, the same reference numerals used throughout the drawings refer to the same or like parts. The various embodiments are not limited to the arrangements and instrumentality shown in the drawings.

FIG. 1 is a schematic diagram of an engine control system 200 according to an embodiment. The engine control system 200 is configured to control a power-generating system. The engine control system 200 may be used in various applications. For example, the engine control system 200 may be mounted in a vehicle, such as an aircraft, a land vehicle, or a water vessel during a trip. The land vehicle may be an automobile, a rail vehicle, or an off-highway vehicle (OHV) (e.g., a vehicle system that is not legally permitted and/or designed for travel on public roadways). When used with a vehicle, the engine control system 200 may control machinery that generates power for propelling the vehicle, braking the vehicle, and/or powering auxiliary loads, such as HVAC, lighting, or the like. The engine control system 200 may alternatively be used with stationary industrial machinery, such as to control power-generating machinery in a manufacturing plant or an assembly plant.

The engine control system 200 includes a controller 202 that controls various operations of the engine control system 200. The controller 202 may include or represent one or more hardware circuits or circuitry that include and/or are connected with one or more processors, controllers, or other hardware logic-based devices. For example, the controller 202 in an embodiment has one or more processors.

The controller 202 is operatively connected with engine components 208 of a power-generating system (not shown). In a vehicle context, the engine components 208 provide tractive/propelling effort and/or braking effort of a propulsion-generating vehicle. The engine components 208 may include or represent one or more engines, motors, alternators, generators, turbochargers, pumps, brakes, batteries, turbines, radiators, input/output (I/O) devices, and/or the like, that operate to provide power-generation under the control implemented by the controller 202. The controller 202 may be configured to generate control signals autonomously or based on manual input that is used to direct operations of the engine components 208.

The engine control system 200 further includes one or more sensors 222 that are configured to monitor one or more of the engine components 208. The sensors 222 are communicatively connected to the controller 202. The sensors 222 are configured to acquire (e.g., measure) operating parameters of the engine components 208, and communicate data measurement signals of the operating parameters to the controller 202 for analysis. The sensors 222 may be operatively coupled to corresponding engine components 208 in order to monitor the engine components 208. For example, the sensors 222 may monitor an on/off status, an operating speed, a setting, and/or a power consumption or generation of a corresponding engine component 208. Some specific examples include a speed sensor 222 that monitors a speed of an engine or motor, a temperature sensor 222 that monitors a temperature of an engine or motor, a pressure sensor 222 that monitors a pressure in a pump, or the like. Other sensors may include ultrasonic sensors, gas and fuel sensors (e.g., oxygen sensors), magnetic sensors (e.g., Hall effect sensors), and/or the like. Optionally, the one or more sensors 222 may include proximity and/or visual sensors that monitor an external environment of a propulsion-generating vehicle, for example.

Each of the one or more sensors 222 may generate a data measurement signal that is transmitted or conveyed to the controller 202. The sensor measurement signals include one or more electrical characteristics representing the operating parameters acquired by the one or more sensors 222. The electrical characteristics may include voltage, current, amplitude, and/or frequency. The controller 202 analyzes the received sensor measurement signals as feedback in order to determine current operations of the engine components 208 of the power-generating system.

The controller 202 controls the engine components 208 under typical operating conditions and during the performance of tests. The engine control system 200 may run various tests on the engine components 208 to ensure that the power-generating machinery functions properly, which may improve safety, increase the lifetime of the engine components 208, and reduce the risk of shutdowns of the power-generating machinery resulting from malfunctioning and/or damaged components 208. More specifically, some tests can be used for debugging and/or testing a new or replacement engine component 208 during commissioning of the engine component 208. For example, during the test the controller 202 may drive the engine component 208 through the test by adjusting various settings of the engine component 208 and may review feedback received from the sensors 222 during the test. Analysis of the feedback can indicate the presence of errors in the operation of the engine component 208. For example, a test of a new I/O device could indicate an error in a panel, wiring, relay, response, or the like. Other tests may be used for testing and/or demonstrating various protections implemented in the engine control system 200. For example, the controller 202 in a specific test may increase the operating speed of a turbocharger or other engine component 208 to a level that exceeds one or more safety thresholds, in order to test the response of the engine control system 200. The test may determine whether the engine control system 200 functions properly in response to the turbocharger exceeding a pre-defined threshold, such as by providing a designated alert. A prescribed response may be to actuate an audible alert via an alarm device 216 and to provide a visual alert message on a display screen 206 of the engine control system 200. The alarm device 216 may include one or more speakers configured to emit an audible alert, one or more lights configured to flash or otherwise emit a visual alert, and/or a vibration motor that emits a vibrational alert.

The engine control system 200 also includes a memory 212 that is operatively connected to the controller 202. The memory 212 may be used for storing information associated with various tests that the engine control system 200 is able to perform on the engine components 208. For example, the test information may include identification of multiple tests, pre-requisites that are necessary in order to perform a given test, instructions for the controller 202 for performing a given test, activity and expectations for a given test intended to be presented to an operator via the display screen 206, and the like. The memory 212 may also be used for storing data collected by the one or more sensors 222 that monitor the engine components 208 and for storing results of completed tests. Furthermore, the memory 212 may store firmware or software corresponding to, for example, a graphical user interface that is presented on the display screen 206. The memory 212 may be a tangible and non-transitory computer readable medium such as flash memory, RAM, ROM, EEPROM, and/or the like.

The display screen 206 is communicatively connected to the controller 202. The display screen 206 may include one or more liquid crystal displays (e.g., light emitting diode (LED) backlight), organic light emitting diode (OLED) displays, plasma displays, CRT displays, and/or the like. For example, the controller 202 can present the status and/or details of the engine components 208, information about various tests that may be performed on the engine components 208, contents of notification messages, and the like to the operator via the display screen 206.

The controller 202 is communicatively connected to an input device 204 and the display screen 206. The controller 202 can receive manual input from an operator through the input device 204. The input device 204 may be a keyboard, a touchscreen, an electronic mouse, a microphone, or the like. For example, the controller 202 can receive a selection of a test to run, an indication to run the test, an indication to end the test prior to completion of the test, and/or an indication to download test results of the test from the input device 204.

In an embodiment, the display screen 206 may be a touchscreen display, which includes at least a portion of the input device 204. For example, the input device 204 may interact with a graphical user interface (GUI) generated by the controller 202 and shown on the display screen 206. In connection with FIG. 2, the GUI may be a computational functional display (CFD) 230.

The controller 202 may be connected with a communication circuit 210. The communication circuit 210 may represent hardware and/or software that is used to communicate with other devices and/or systems, such as remote vehicles or dispatch stations. The communication circuit 210 may include a transceiver and associated circuitry (e.g., an antenna 214) for wireless bi-directional communication of various types of messages, such as linking messages, command messages, reply messages, status messages, and/or the like. Optionally, the communication circuit 210 includes circuitry for communicating messages over a wired connection, such as an electric multiple unit (eMU) line (not shown) between vehicles of a vehicle system, a catenary or conductive rail of a track, or the like.

The schematic diagram of FIG. 1 shows all of the components of the engine control system 200 (except for the antenna 214) bounded within a border 218, but the border 218 need not represent a housing or case that physically surrounds all of the identified components. For example, the border 218 may broadly represent a vehicle, such as a locomotive or a marine vessel, or a facility, such as a manufacturing or assembly plant. Thus, at least some of the illustrated components of the engine control system 200 may be different devices that are physically separated from one another and communicatively connected to one another via wireless and/or wired connections. For example, at least some of the engine components 208 and the sensors 222 may be physically spaced apart from the controller 202. In an embodiment, some of the components of the engine control system 200 are contained within a common housing or case. For example, the controller 202 and the memory 212 may be disposed together in a common housing. Furthermore, the display screen 206, the controller 202, and/or the input device 204 may be contained within a common housing of a control device that is mounted in a vehicle or a manufacturing plant, for example. Thus, an operator does not need to plug a remote device, such as a laptop, into the controller 202 in order to view details and provide instructions to the controller 202 to perform a test.

Figure 2:
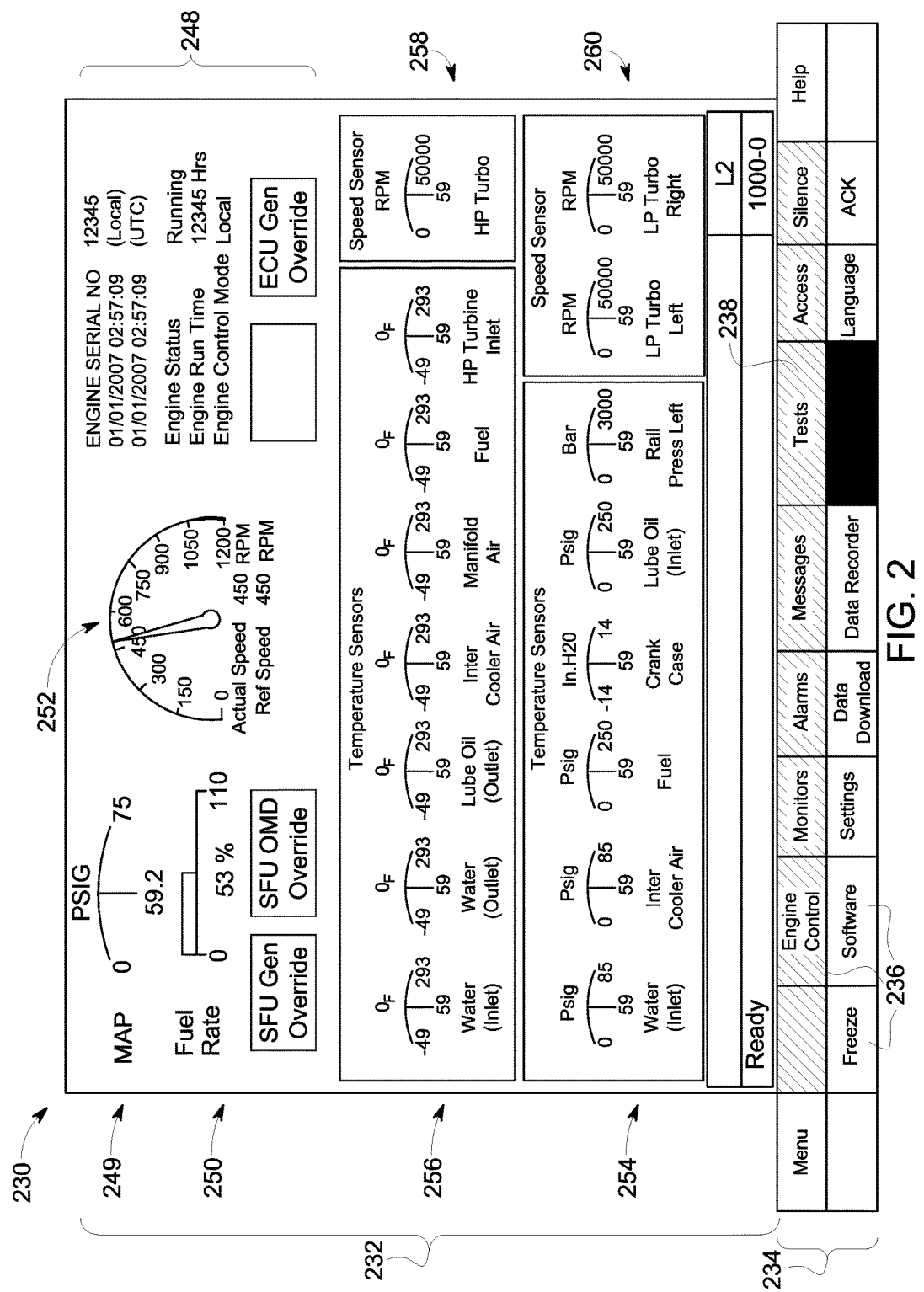
FIG. 2 is an illustration of a computational functional display shown on a display screen of the engine control system.

FIG. 2 is an illustration of the CFD 230 shown on the display screen 206 of the engine control system 200 (shown in FIG. 1). The CFD 230 includes an indicator region 232 and an operation menu 234. The indicator region 232 may display information associated with an operational status of the power-generating system. The indicator region 232 may include one or more operational indicators such as gauges, meters, numerical values, warning indicators, graphs, and/or the like. The indicator region 232 may be sub-divided into an operational information window 248 and various other windows. The operational information window 248 may include time information, identification information of a power-generating system, operational modes of the power-generating system, a navigational indicator 249, an efficiency indicator 250, an operating indicator 252, and/or the like. The navigational indicator 249 displays the progress of the vehicle along a designated trip. The efficiency indicator 250 displays the running efficiency of the vehicle. For example, the efficiency indicator 250 may include a fuel rate meter. The operating indicator 252 provides a current operating parameter of the power-generating system, such as an actual speed in revolutions per minute (RPM) of an engine of the power-generating system. The operating indicator 252 optionally may be a tachometer.

In addition to the operational information window, the indicator region 232 may also include one or more parameters windows 254-260 corresponding to parameters (e.g., temperature, speed, pressure, etc.) monitored by the one or more sensors 222. For example, the indicator region 232 in the illustrated embodiment includes a pressure window 254, a temperature window 256, and speed windows 258, 260. Each of the parameter windows 254-260 includes at least one gauge corresponding to one or more engine components 208 monitored by the sensors 222. Optionally, the operator can use the input device 204 to move a size and/or position of one or more of the windows 254-260 shown in the indicator region 232. Additionally or alternatively, the operator may use the input device 204 to change, remove, and/or add parameter windows of the indicator region 232 and/or change engine components 208 represented by the gauges included in the windows 254-260.

The operation menu 234 of the CFD 230 may include one or more selectable interface keys 236 that may be selected, manipulated, and/or activated by the operator via the input device 204. For example, the interface keys 236 may be selected using a touch screen, a keyboard, a stylus, and/or mouse. The operator may select the interface key 236 titled "Tests" 238 (referred to herein as "tests key" 238) to browse lists of various tests that may be performed on the power-generating system, read test details about one or more of the tests, and optionally perform one or more of the tests. The interface keys 236 may be presented in various shapes and colors, such as a graphical or selectable icon, a slide bar, a cursor, and/or the like. The interface keys 236 may include text and/or symbols. It may be noted that in other embodiments the operation menu 234 may be a toolbar, a drop down menu, and/or the like. The CFD 230 shown in FIG. 2 may be considered a home or root menu page, from which an operator can navigate to different sections of the engine control system 200 using the operation menu 234, such as settings, downloads, alarms, messages, engine control, software, monitors, data recorders, language, help, silence, access, and/or the like. In connection with FIG. 3, the operator may select the tests key 238 of the CFD 230 to view a list of tests that may be performed on the power-generating system by the engine control system 200.

Figure 3:
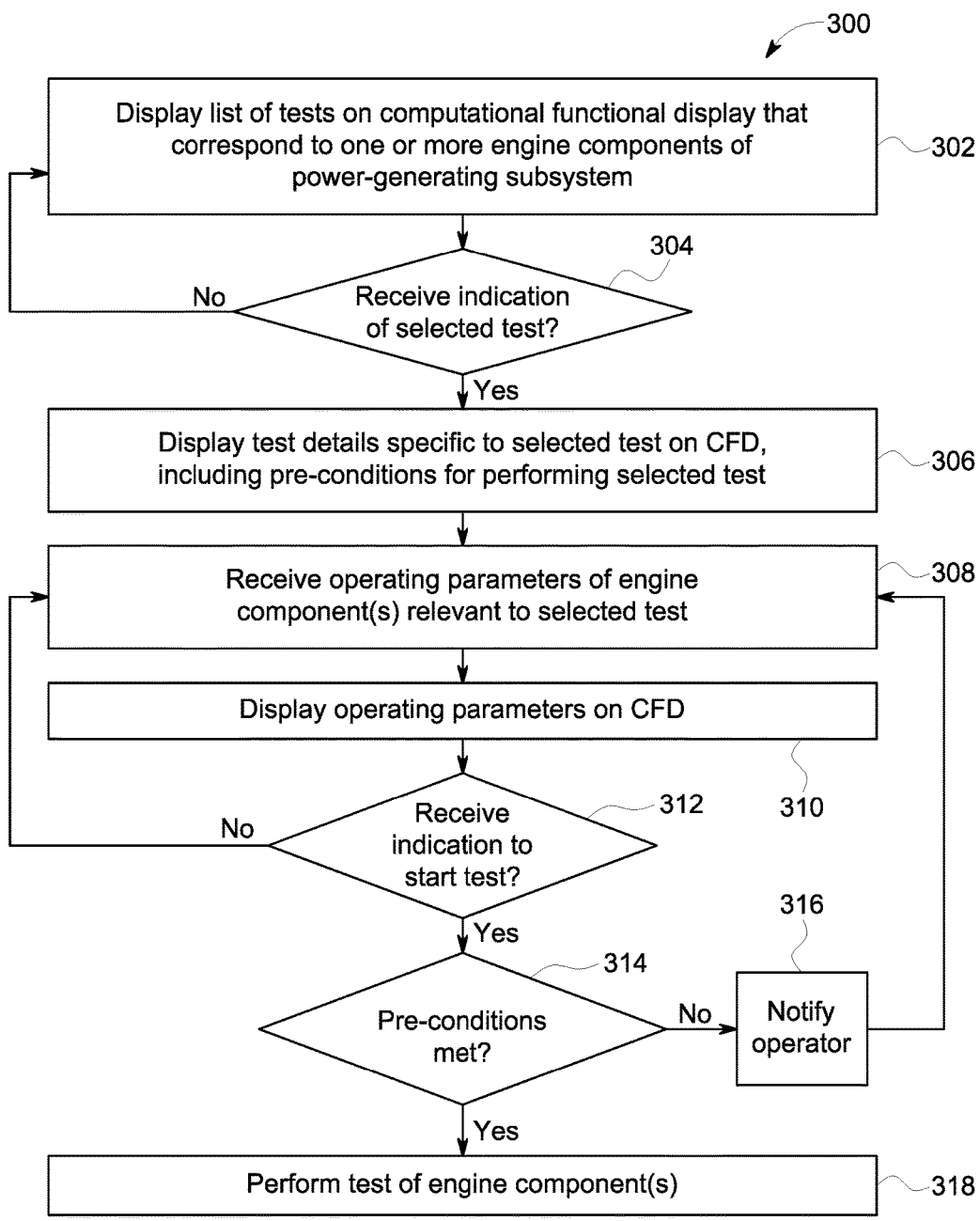
FIG. 3 is a flowchart of a method for displaying test details prior to performing a test of a power-generating system in accordance with an embodiment.

FIG. 3 is a flowchart of a method 300 for displaying test details prior to performing a test of one or more engine components 208 of the power-generating system. The method 300, for example, may employ or be performed by structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 300 may be able to be used as one or more algorithms to direct hardware to perform one or more operations described herein.

One or more methods may (i) display test details that are specific to a selected test for the controller to perform on the one or more engine components, the test details including pre-conditional parameters of the one or more engine components that are necessary prior to starting the selected test; (ii) receive measured operating parameters of the one or more engine components from one or more sensors; (iii) determine whether the measured operating parameters satisfy the pre-conditional parameters; and (iv) responsive to both receiving an indication to start the selected test and verifying that the measured operating parameters satisfy the pre-conditional parameters, perform the selected test on the one or more engine components.

At 302, a list of tests is displayed on the display screen 206. The list of tests may be presented on a CFD. The tests correspond to one or more engine components 208 of the power-generating subsystem. The engine components 208 may be one or more of a pump, an engine, a turbocharger, a motor, a generator, an alternator, a radiator, or the like. The tests may be identified by titles and may also be grouped in categories.

Figure 4:
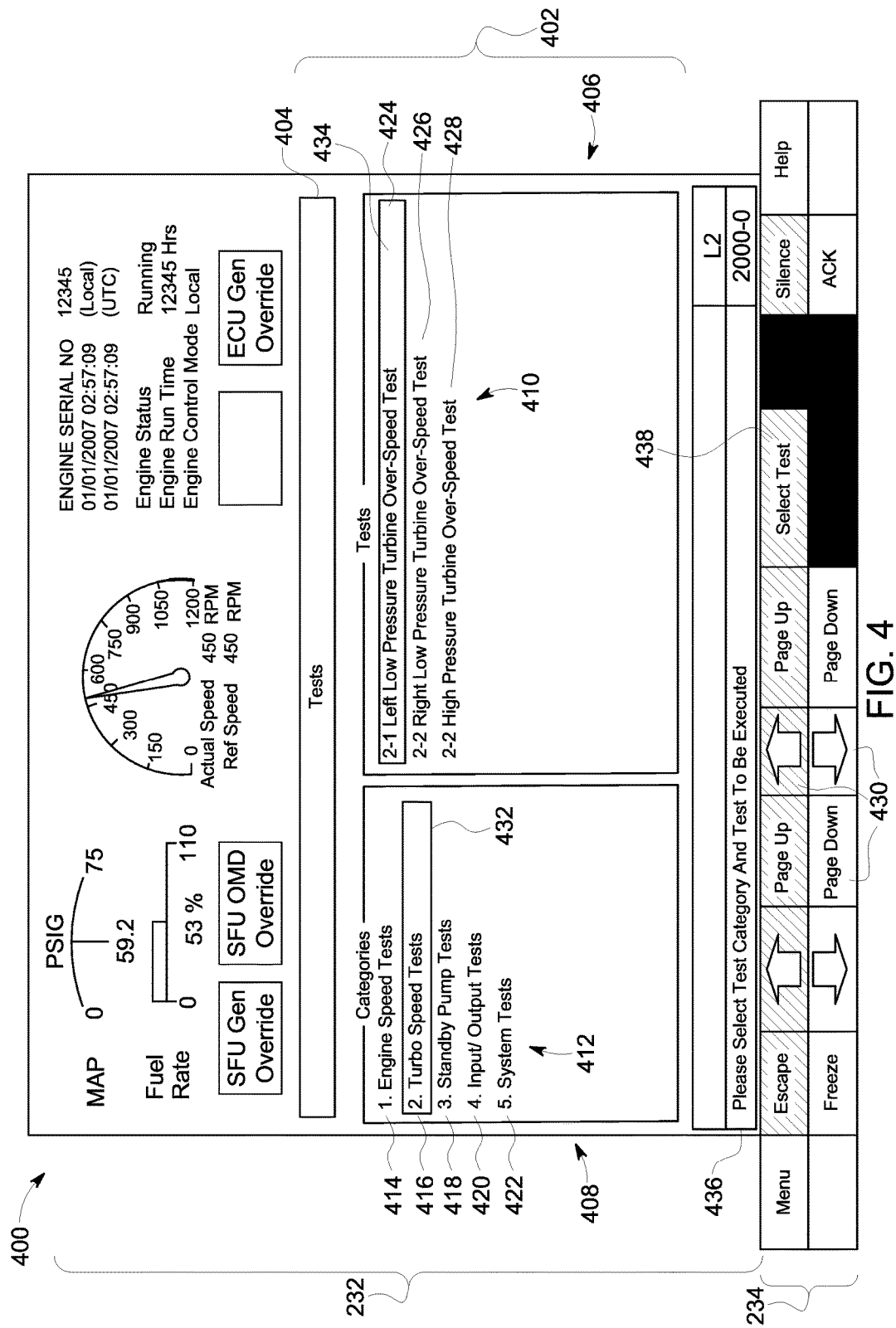
FIG. 4 is an illustration of a test selection screen of a computational functional display shown on a display screen of the engine control system.

Referring now to FIG. 4, FIG. 4 is an illustration of a test selection screen 402 of a CFD 400 shown on the display screen 206 of the engine control system 200. The test selection screen 402 may be accessed by the operator by selecting the tests key 238 (shown in FIG. 2) on the operation menu 234 of the CFD 230 (FIG. 2). When the tests key 238 is selected, the controller 202 may adjust the indicator region 232 to include the test selection screen 402. For example, the controller 202 may replace the windows 254-260 with the test selection screen 402. The controller 202 controls the information that is presented by the display screen 206. For example, the windows and bars described herein may present information that is stored on one or more databases in the memory 212 and retrieved by the controller 202.

The test selection screen 402 may include a title bar 404 and at least one display window. The title bar 404 indicates a generic description of the information illustrated in the test selection screen 402 of the CFD 400 shown on the display screen 206. For example, the title bar 404 may include textual, numerical, and/or graphical information that indicates that the test selection screen 402 is being displayed on the CFD 400 and/or the display screen 206. The title bar 404 states "Tests" in the illustrated embodiment.

The illustrated embodiment includes two display windows 406, 408 in the test selection screen 402. A test window 406 displays a first list 410 of multiple tests that the engine control system 202 may be configured to perform on one or more of the engine components 208. The multiple tests in the first list 410 may be interrelated within a common test category. A category window 408 adjacent to the test window 406 displays a second list 412 that represents multiple test categories. The multiple tests displayed at a given time in the test window 406 may be tests that are grouped within one of the test categories listed in the category window 408. For example, the operator may navigate the CFD 400 to select a specific test by first selecting one of the test categories in the category window 408. Prior to selecting one of the test categories in the category window 408, the test window 406 optionally may be blank or may display the tests that are affiliated with a previously selected or default test category. In the illustrated embodiment, the test categories include engine speed tests 414, turbo speed tests 416, standby pump tests 418, input/output tests 420, and system tests 422. The operator may select one of the test categories using the input device 204, such as by interacting with navigational keys 430 on the operation menu 234 to highlight a desired one of the test categories.

Once a category is selected, the controller 202 updates or adjusts the test window 406 to display the one or more tests affiliated with the selected category. In the illustrated embodiment, the turbo speed tests category 416 is selected (as indicated by the text "turbo speed tests" being highlighted by a box 432), and the test window 406 displays three tests within the turbo speed tests category 416. The tests include left low pressure turbine over-speed test 424, right low pressure turbine over-speed test 426, and high pressure turbine over-speed test 428. In the illustrated embodiment, the left low pressure turbine over-speed test 424 is highlighted by box 434. It is noted that the specific tests, test categories, and numbers of tests and test categories shown in the illustrated embodiment are merely examples. The number of tests that are affiliated with a corresponding test category may number more or less than three in other embodiments and/or for other test categories.

Although the CFD 400 in the illustrated embodiment displays both the category window 408 and the test window 406 concurrently in the test selection screen 402, in an alternative embodiment, the controller 202 may control the display screen 206 to display the category window 408 and the test window 406 sequentially or consecutively, such that the category window 408 is displayed first, and then the test window 406 is displayed while the category window 408 is no longer displayed.

The CFD 400 further includes a message bar 436 that is located between the test selection screen 402 and the operation menu 234. The message bar 436 provides a textual and/or numerical message to the operator. The message corresponds to the current information presented in the indicator region 232. The message in the message bar 436 may provide instructions to an operator, status updates, descriptions of alerts, and/or the like. In the illustrated embodiment, the message bar 436 provides instructions for an operator to "Please select test category and test to be executed."

Referring now back to FIG. 3, at 304 a determination is made whether indication of a selected test has been received by the engine control system 200. The indication of a selected test is made by an operator using the input device 204 to select one of the tests in the test window 406 (shown in FIG. 4). For example, in the CFD 400, once a given test is highlighted by the box 434, that test may be selected by actuating a "Select Test" key 438 (referred to herein as "select test key" 438) of the operation menu 234. The input device 204 transmits an electrical signal to the controller 202 when such a selection is made. If no indication of a selected test has been received, flow of the method 300 returns to 302, such that the display screen 206 continues to show the test selection screen 402. Optionally, after a designated period of time without receiving an indication of a selected test, the controller 202 may switch the display screen 206 back to displaying the home screen shown in FIG. 2.

If an indication of a selected test has been received, flow of the method 300 continues to 306 and test details specific to the selected test are displayed on the display screen 206. The test details include pre-conditions or pre-requisites that are necessary in order to perform the selected test. For example, the controller 202 is programmed or configured to not perform the selected test until all of the pre-conditions for the selected test are satisfied. The pre-conditions may be associated with operating parameters of one or more of the engine components 208. For example, the pre-conditions may include an on/off status, an operating speed, a power consumption level, a communication quality status, and/or a threshold setting of one or more engine components 208 that are relevant to the selected test. The engine components 208 that are relevant to a selected test are the engine components 208 that are adjusted and/or manipulated by the controller 202 and/or are monitored by the sensors 222 during the performance of the selected test.

The test details may include additional information besides the pre-conditions, such as projected activity of one or more engine components 208 and the alarm device 216 (shown in FIG. 1) that is expected to occur during the performance of the selected test. The projected activity may include adjustments that are to be made to the one or more engine components 208, such as increasing an operating speed of a turbine or turbocharger. The projected activity may also include expected alerts that may be triggered in response to the operating parameters of the engine component 208 exceeding one or more designated thresholds.

At 308, operating parameters of one or more engine components 208 relevant to the selected test are received by the controller 202 from the one or more sensors 222. The operating parameters are measured by the sensors 222 and received from the sensors 222 in the form of electrical data measurement signals. The measured operating parameters represent current operations of the engine components 208, and may be updated periodically as the controller 202 receives updated data measurement signals from the sensors 222. At 310, the measured operating parameters are displayed on a CFD of the display screen 206. For example, the display screen 206 may display measured operating parameters of one or more of the engine components 208 in real-time. The measured operating parameters may be used by the controller 202 to determine whether the pre-conditions for performing the selected test are satisfied.

Figure 5:
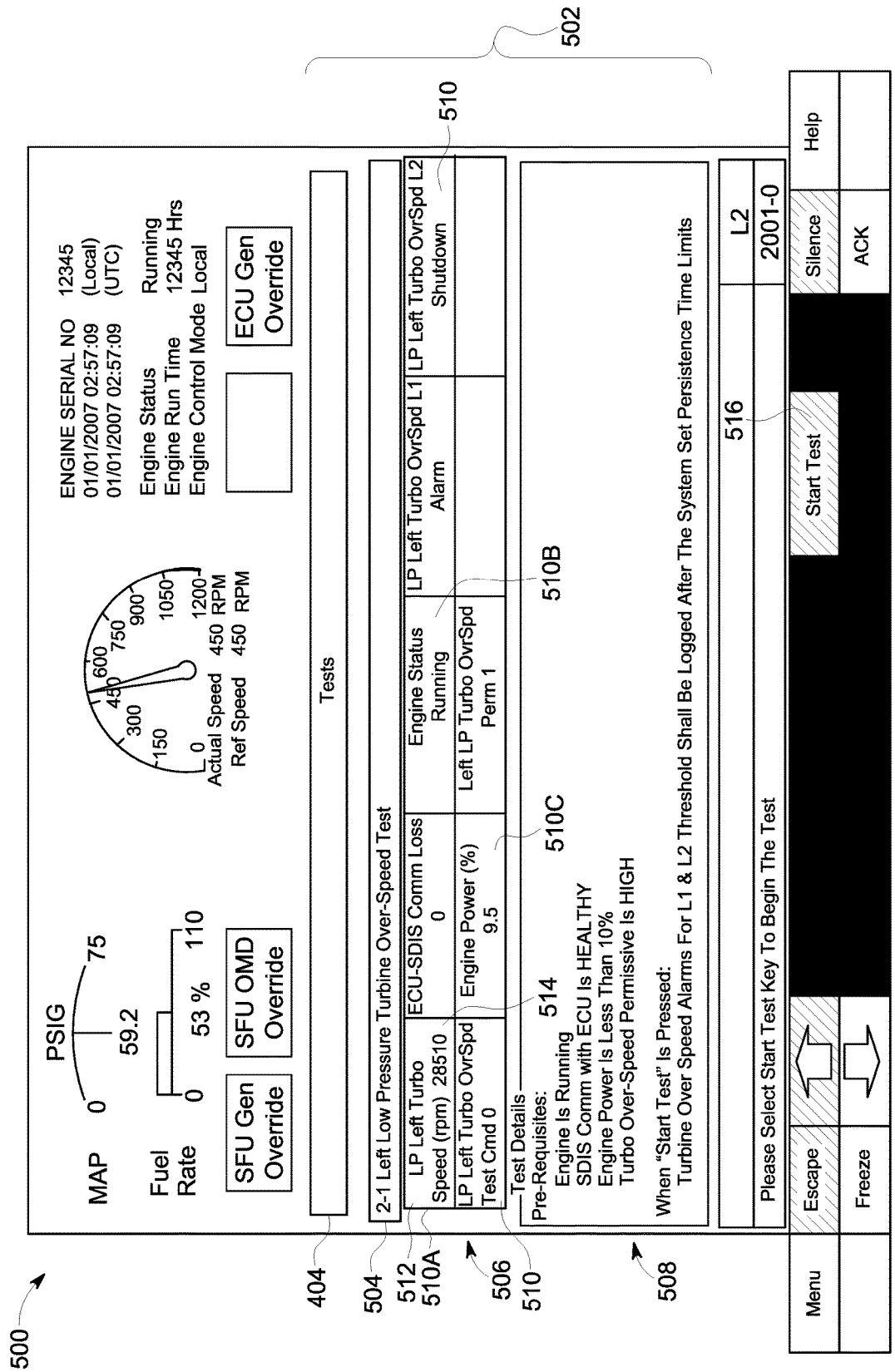
FIG. 5 illustrates a test detail screen of a computational functional display shown on a display screen of the engine control system.

FIG. 5 illustrates test details on a CFD 500 shown on the display screen 206 of the engine control system 200 in a test detail screen 502. The test detail screen 502 may be accessed by the operator when the select test key 438 (shown in FIG. 4) is selected by the operator after one of the tests in the test window 406 is highlighted. For example, pressing the select test key 438 when the left low pressure turbine over-speed test 424 is highlighted causes the controller 202 to replace the test selection screen 402 with the test detail screen 502. The test detail screen 502 includes the title bar 404, a sub-title bar 504, an operating parameter window 506, and a test detail window 508. The title bar 404 is unchanged from the CFD 400, and still states "Tests." The sub-title bar 504 identifies the selected test that has been selected by the operator from the test selection screen 402, which in the illustrated embodiment is the "Left Low Pressure Turbine Over-Speed Test." The operating parameter window 506 is disposed between the sub-title bar 504 and the test detail window 508, although the location of the windows 506, 508 and the bars 404, 504 on the display screen 206 may be rearranged by the operator using the input device 204.

The measured operating parameters of one or more engine components 208 that are received by the controller 202 from the sensors 222 are presented in the operating parameter window 506 of the CFD 500. The controller 202 may filter the received operating parameters to only display the operating parameters of engine components 208 that are relevant to the selected test. In the illustrated embodiment, since the selected test is a left turbine over-speed test, the operating parameters displayed in the window 506 correspond to relevant engine components 208, such as a left turbocharger (that includes the turbine) and an engine of the power-generating system. The parameter window 506 is organized in multiple cells 510, and each cell 510 provides different information. For example, each cell 510 includes a parameter title 512 and a parameter value 514 that is measured or recorded by an applicable sensor 222. In the illustrated embodiment, one cell 510A indicates that the current operating speed of the low power left turbocharger is 28,510 rpm.

The test details specific to the selected test are presented in the test detail window 508. The test detail information may be retrieved by the controller 202 from the memory 212. In the illustrated embodiment, the test detail window 508 is a text box that presents both the pre-conditions for the selected test and the projected activity during the selected test in a textual format. For example, the pre-conditions or pre-requisites for the left low pressure turbine over-speed test require that the engine be running, the communication quality status between the engine control system 202 and the engine components 208 be good or "Healthy," the engine power be less than 10%, and the turbocharger over-speed permissive be set to "High." The information presented as projected activity during the test states that when "Start Test" is pressed, turbine over-speed alarms for level one and level two thresholds will be logged after system set persistence time limits. In an alternative embodiment, the pre-requisites and projected activity may be separated into two different windows or cells instead of being displayed together in the same test detail window 508.

The CFD 500 shows that both the test details and the operating conditions are presented concurrently on the display screen 206. By "concurrently," there is a period of time in which both the test details and the operating conditions are displayed on the display screen 206, even though one of the test details and the operating conditions may be displayed on the display screen 206 before the other is displayed or one may continue to be displayed after the other is no longer displayed. Thus, operator is able to visually see how the operating conditions compare to the pre-requisites. For example, one of the pre-conditions is for the engine to be running, and the cell 510B in the parameter window 506 indicates that the engine is indeed running. The controller 202 is programmed to analyze the operating parameters to determine if the pre-conditions are satisfied.

Optionally, if the controller 202 determines that any of the pre-conditions for running the selected test are not satisfied, the controller 202 may provide an alert indication on the CFD 500 designed to notify the operator. For example, since one of the illustrated pre-conditions is that the engine power is less than 10%, if the operating parameters indicate that the engine power is currently greater than 10%, the controller 202 determines that the pre-condition is not satisfied. In response, the controller 202 may provide indicia on the CFD 500, such as by highlighting the cell 510C that displays the current engine power parameter, controlling the cell 510C or the text therein to flash, or displaying a warning symbol in the cell 510C.

The operation menu 234 on the CFD 500 includes a start test key 516. The start test key 516 is selected by the operator in order to command the engine control system 200 to commence the selected test. An alternative or additional way that the controller 202 may indicate that the pre-conditions are not satisfied is by disabling or removing the start test key 516. Thus, the operator would not be able to select the start test key 516. The controller 202 may only enable or display the start test key 516 once the pre-conditions are satisfied.

Referring now back to FIG. 3, at 312 a determination is made whether an indication to start the selected test has been received by the engine control system 200. The indication of the selected test is made by an operator using the input device 204 to select the start test key 516 (shown in FIG. 5). If an indication to start the selected test has not been received, flow of the method 300 returns to 308 and the controller 202 receives updated operating parameters of the one or more engine components 208 from the sensors 222.

If, on the other hand, an indication to start the selected test has been received, flow continues to 314 and a determination is made whether the pre-conditions have been met. For example, the controller 202 may be programmed to only run a selected test when all of the pre-conditions are satisfied. If the controller 202 determines that all of the pre-conditions are satisfied by the measured operating parameters, then flow of the method 300 proceeds to 318 and the selected test of the one or more engine components 208 is performed by the controller 202. On the other hand, if not all of the pre-conditions are satisfied, then flow continues to 316 and the operator is notified.

At 316, the controller 202 notifies the operator that the received command to start the selected test will not be followed because not all of the pre-conditions for running the test are satisfied. The controller 202 may notify the operator by controlling the alarm device 216 to provide a visual, audible, and/or vibrational alert. Furthermore, a message bar (e.g., the message bar 436 shown in FIG. 4) on the display screen 206 may display a text-based message to the operator informing the operator of the issue. Optionally, the controller 202 may be programmed to indicate to the operator which of the pre-conditions is not satisfied, such as by providing indicia in the test detail window 508 associated with the one or more pre-conditions that are not satisfied, providing indicia in the one or more cells 510 of the operating parameters that are deficient, identifying the unsatisfied pre-conditions in the message bar 436, and/or the like. By making the operator aware of the deficiencies, the operator may be able to address the issues in an efficient manner.

Figure 6:
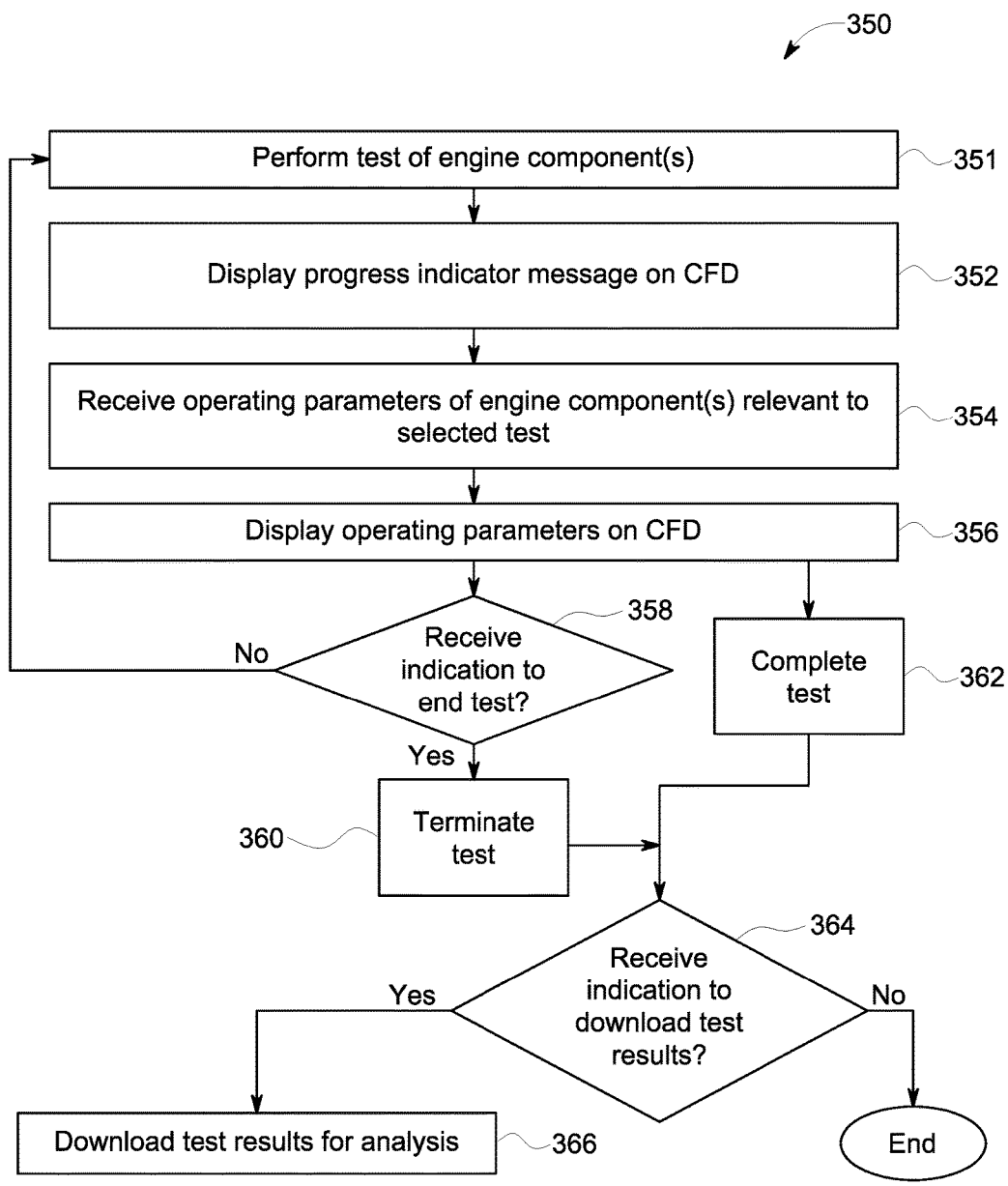
FIG. 6 is a flowchart of a method for displaying test details during performance of a test of the power-generating system in accordance with an embodiment.

FIG. 6 is a flowchart of a method 350 for displaying test details during performance of a test of one or more engine components 208 of the power-generating system. The method 350 may be related to the method 300 shown in FIG. 3. For example, the method 350 may be a continuance of the method 300. At 351, the test of one or more engine components 208 is started. The test may be performed by the controller 202 adjusting operational settings of one or more engine components 208 to test how the engine components 208, the engine control system 200, and the power-generating system respond to the adjusted settings. The controller 202 may adjust the settings of the engine components 208 according to instructions stored in a test plan of the selected test. The test plan for each test may be stored in a database in the memory 212. The test plan may provide instructions for the controller 202 that outlines which engine components 208 to manipulate and how to adjust the operational settings of those components 208. For example, the test plan may call for the controller 202 to increase the operational speed of the left turbocharger gradually over time until the speed reaches one or more designated speeds. A first designated speed may exceed a first threshold level, and a second designated speed may exceed a second threshold level. Thus, the test may be used to determine whether the safety and warning systems in place in the power-generating system are working properly, as various warnings and/or alerts are designed to be activated upon the turbocharger exceeding each of the threshold levels.

At 352, during the test, a progress indicator message is displayed on the CFD on the display screen 206. The progress indicator message may provide a status of the test. The status may indicate current activity that is taking place during the performance of the test, a current stage of the test, and/or a current test that is being performed in a sequence of multiple tests. The current activity described in the progress indicator message may include information about the one or more engine components 208 that are being adjusted, such as to state, for example, how that the operating speed of the left turbocharger is being increased to the first threshold level. The current action also may include information about warnings and/or alerts, such as to identify the reason for a current audible and/or visible alarm.

Figure 7:
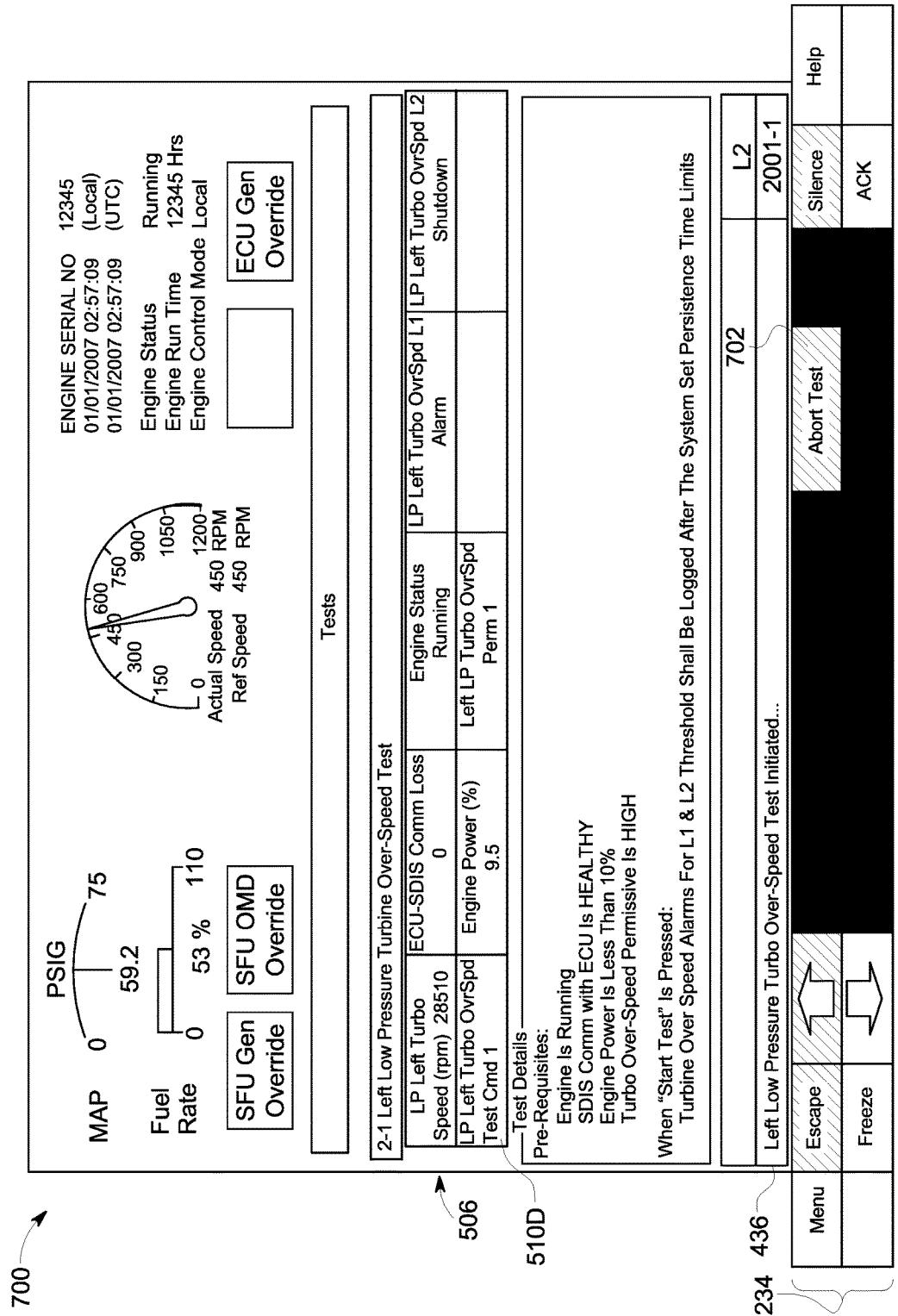
FIG. 7 illustrates a test detail screen of a computational functional display shown on a display screen of the engine control system during performance of the test.

FIG. 7 illustrates a CFD 700 shown on the display screen 206 of the engine control system 200 during performance of a selected test. The information presented in the test detail window 508 is the same as on the CFD 500 shown in FIG. 5. Since the left low pressure turbine over-speed test has started, the value of the operating parameter "Left Turbo Over-Speed Test Command" in cell 510D has switched from 0 to 1. The progress indicator message is displayed in the message bar 436. The current progress indicator message in the CFD 700 states that the left low pressure turbo over-speed test has been initiated. The controller 202 may revise the progress indicator message periodically as the test progresses.

Additional reference will now be made back to FIG. 6. At 354, operating parameters of one or more engine components 208 that are relevant to the test being performed are received from the sensors 222. At 356, the operating parameters that are relevant to the test are displayed on the CFD 700 in the operating parameter window 506. The steps 354 and 356 are similar to the steps 308 and 310, respectively, in the method 300 shown in FIG. 3, so the steps 354 and 356 will not be described in detail again. The operating parameters of the engine components 208 may be continually monitored and updated on the display screen 206 both prior to and during performance of a test.

At 358, a determination is made whether an indication to end the test in progress has been received. The operator may command the engine control system 200 to end the test prematurely by selecting an abort test key 702 in the operation menu 234, as shown on the CFD 700 in FIG. 7, using the input device 204. If such an indication has been received, the flow of the method 350 may proceed to 360 and the controller 202 may terminate the test. If such an indication has not been received, flow may return to 351 and the test may continue running as planned. If no indication to end the test has been received before the full performance of the test, then flow of the method 350 continues to 362 from the 356. At 362, the test is completed.

Figure 8:
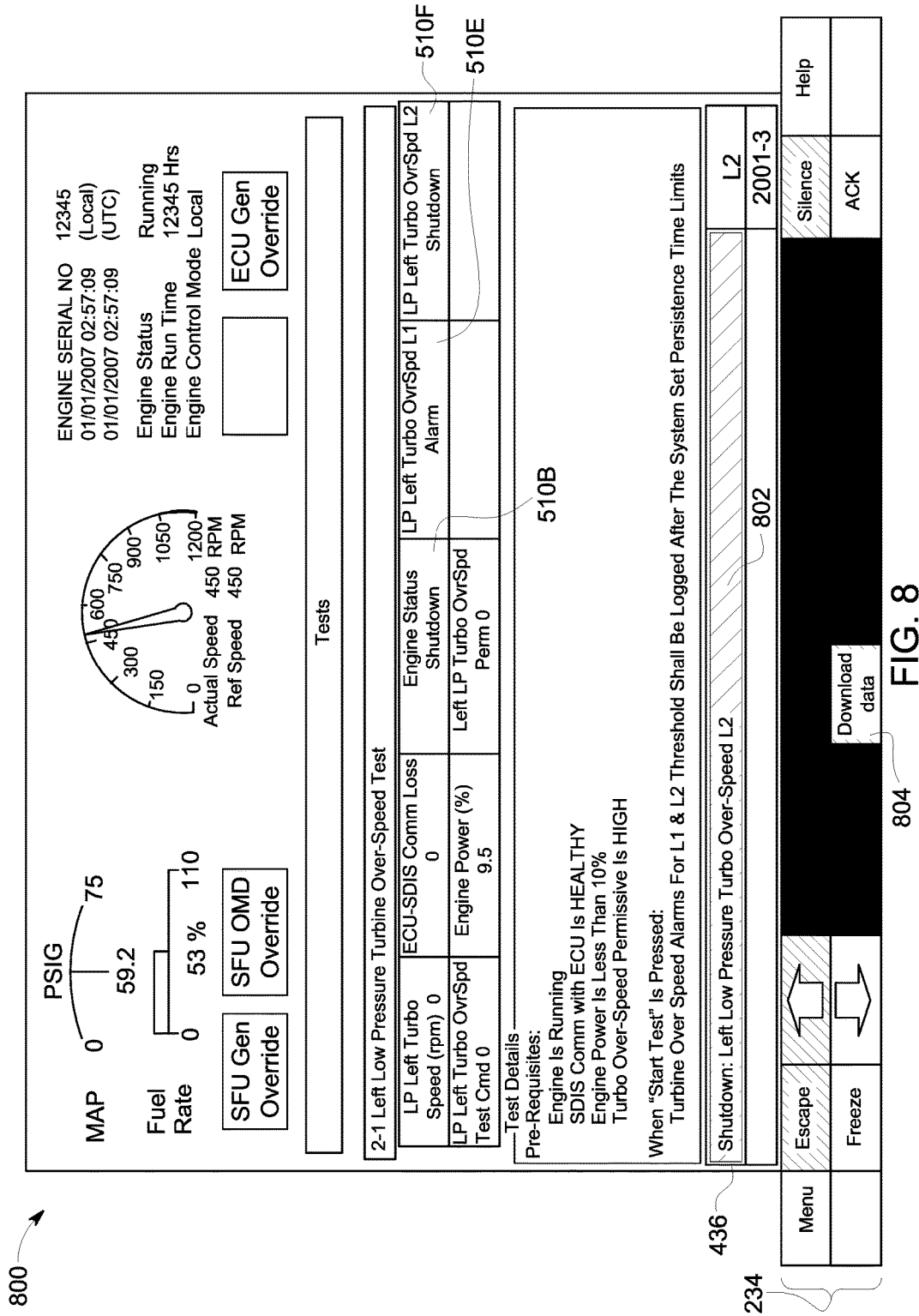
FIG. 8 illustrates a computational functional display shown on a display screen of the engine control system at or near the end of a test.

Reference is now made to FIG. 8, which illustrates a CFD 800 shown on the display screen 206 of the engine control system 200 at or near the end of a selected test. The cell 510E shows that the settings mandate that an "Alarm" is triggered in response to the operating speed of the left turbocharger exceeding a first threshold level ("L1"), and adjacent cell 510F mandates that the engine be "Shutdown" in response to the speed of the left turbocharger exceeding a second threshold level ("L2"). The message bar 436 on the CFD 800 states that the engine has been shut down due to the left low pressure turbocharger exceeding the second over-speed threshold L2. The message bar 436 is highlighted in a box 802 in order to draw the operator's attention. For example, the engine control system 200 may activate various alerts, such as audible sounds, visible flashing lights, etc., in response to the turbocharger exceeding the over-speed threshold L2. The message bar 436 informs the operator the reason for the alerts, and also provides the current status of the engine as no longer running. The cell 510B in the operating parameter window 506 also indicates that the current engine status is in a shutdown mode.

Additional reference is now made back to FIG. 6. In an embodiment, regardless of whether the test has been terminated prematurely at 360 or has completed as planned at 362, flow of the method 350 proceeds to 364. At 364, a determination is made whether an indication to download test results has been received. The indication to download test results may be received from the operator using the input device 204. The operator may select a download data key 804 in the operation menu 234 of the CFD 800 to provide the indication to the controller 202. The controller 202 may present the download data key 804 on the CFD 800 after a test has ended, such as via pre-mature termination or completion. The test results may include data parameters measured by the one or more sensors 222 during the test. The data parameters may indicate how the engine control system 200, including the controller 202, alarm device 216, and one or more engine components 208 reacted to the adjustments made during the test. If an indication to download the test results has been received, flow of the method 350 continues to 366 and the test results are downloaded for analysis. The test results may be stored in a database in the memory 212 and/or may be communicated remotely using the communication circuit 210. Furthermore, the test results may be displayed by the controller 202 on the display screen 206 and/or printed onto a hard copy in order to be viewable for the operator. If no indication to download test results is received for a designated period of time, the method 350 ends.

Figure 9:
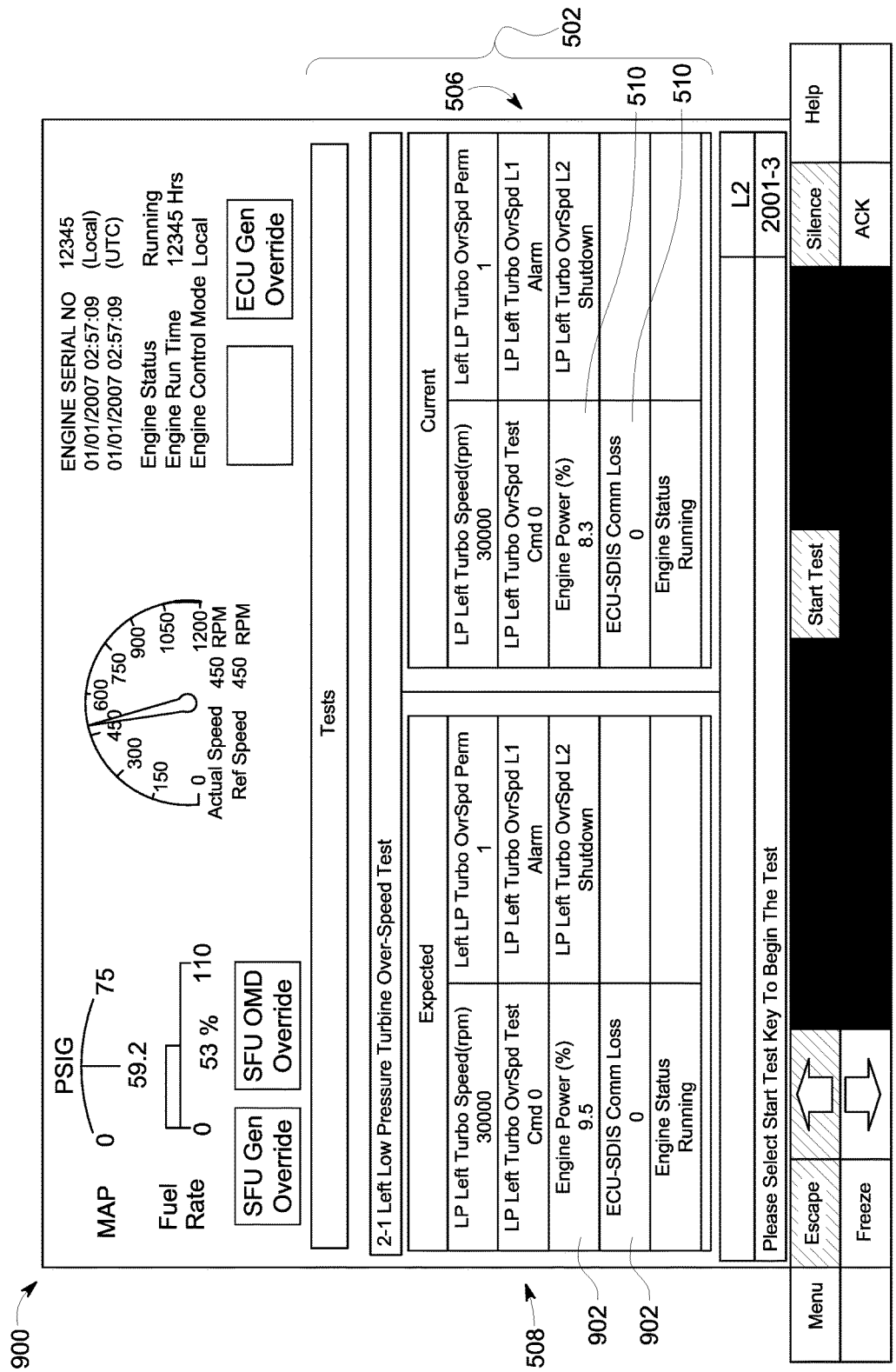
FIG. 9 illustrates a test detail screen of a computational functional display shown on a display screen of the engine control system according to an alternative embodiment.

FIG. 9 illustrates test details on a CFD 900 shown on the display screen 206 of the engine control system 200 according to an alternative embodiment. The CFD 900 may be an alternative to the CFD 500 shown in FIG. 5. The CFD 900 is shown on the display screen 206 after a test has been selected form a list, but prior to starting the selected test. In the illustrated embodiment, the test detail screen 502 is rearranged such to include the operating parameter window 506 side-by-side laterally with the test detail window 508 in a split-screen format. The test detail window 508 formatted in a chart containing multiple cells 902. The cells 902 provide the pre-conditions that are necessary prior to running the selected test. Each cell 902 corresponds to one of the cells 510 in the operating parameter window 506, so the operator can visually compare the current operating parameters to the corresponding pre-conditions. Although not shown in the CFD 900, the controller 202 optionally may emphasize any pre-conditions that are currently unsatisfied by providing a visual indication, such as by highlighting the corresponding cells 902, providing a different color font in the cells 902, and/or flashing the cells 902. Optionally, although not shown, the test detail window 502 may include a separate window below the test detail window 508 and the operating parameter window 506 that describes projected activity that is to occur during the performance of the selected test.

Figure 10:
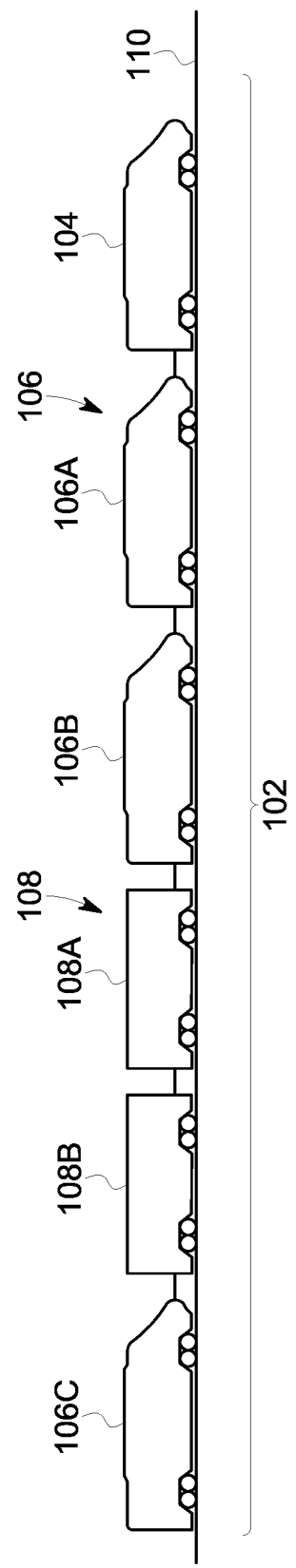
FIG. 10 illustrates a vehicle system in accordance with an embodiment in which the engine control system is implemented on the vehicle system.

FIG. 10 illustrates one embodiment of a vehicle system 102, in accordance with an embodiment. In one embodiment, the engine control system 200 may be implemented on the vehicle system 102. The engine control system 200 may control a propulsion-generating system on the vehicle system 102, including traction motors, brakes, and the like. The engine control system 200 is not limited to be implemented on the illustrated vehicle system 102. The illustrated vehicle system 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other. The propulsion-generating vehicles 104, 106 are shown as locomotives, the non-propulsion-generating vehicles 108 are shown as rail cars, and the vehicle system 102 is shown as a train in the illustrated embodiment. The number and arrangement of the vehicles 104, 106, 108 in the vehicle system 102 are provided as one example and are not intended as limitations on all embodiments of the subject matter described herein.

Optionally, groups of one or more adjacent or neighboring propulsion-generating vehicles 104 and/or 106 may be referred to as a vehicle consist. For example the vehicles 104, 106A, 106B may be referred to as a first vehicle consist of the vehicle system 102 and the vehicle 106C referred to as a second vehicle consist of the vehicle system 102. The propulsion-generating vehicles 104, 106 may be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle system 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle system 102 (e.g., along a direction of travel of the vehicle system 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

In an embodiment, a system (e.g., an engine control system) is provided that includes one or more sensors and a controller. The one or more sensors are configured to monitor operating parameters of one or more engine components. The controller has one or more processors. The controller is operatively connected to the one or more sensors and the one or more engine components. The controller is programmed to perform operations in response to instructions stored on a non-transitory memory. The operations include displaying test details on a display screen. The test details are specific to a selected test for the controller to perform on the one or more engine components. The test details include pre-conditional parameters of the one or more engine components that are necessary prior to starting the selected test. The operations also include receiving the monitored operating parameters of the one or more engine components from the one or more sensors, and determining whether the monitored operating parameters satisfy the pre-conditional parameters. The operations further include, responsive to both receiving an indication to start the selected test and determining that the measured operating parameters satisfy the pre-conditional parameters, performing the selected test on the one or more engine components.

Optionally, the controller is programmed to provide at least one of a visual or an audible alert for an operator responsive to receiving the indication to start the selected test when the monitored operating parameters do not satisfy the pre-conditional parameters. The controller is programmed to not perform the selected test until all of the pre-conditional parameters are satisfied.

Optionally, in response to determining that at least one of the pre-conditional parameters are not satisfied by the monitored operating parameters, the controller is programmed to provide a visual alert on the display screen that indicates the at least one pre-conditional parameter that is not satisfied.

Optionally, the system further includes an input device configured to receive selections from an operator. The controller is programmed to receive the indication to start the selected test from the input device.

Optionally, the controller is further programmed to display a list of multiple tests on the display screen prior to displaying the test details. The selected test is one of the tests in the list. The controller is configured to display the test details of the selected test responsive to receiving an indication of the selected test by an operator using an input device.

Optionally, the test details include the pre-conditional parameters and projected activity of the one or more engine components that is expected to occur during performance of the selected test.

Optionally, the system further includes the display screen. The controller and the display screen are disposed in a housing of a device.

Optionally, the controller is further programmed to display the monitored operating parameters of the one or more engine components on the display screen. The monitored operating parameters are displayed concurrently with the pre-conditional parameters of the selected test prior to performing the selected test.

Optionally, the test details are presented on a computational functional display on the display screen.

Optionally, the one or more engine components include one or more of a pump, a turbocharger, a motor, an engine, a generator, or a radiator.

In another embodiment, a method (e.g., for testing an engine) is provided that includes displaying test details on a display screen. The test details are specific to a selected test for performance on one or more engine components. The test details include pre-conditional parameters of the one or more engine components that are necessary prior to starting the selected test. The method also includes receiving monitored operating parameters of the one or more engine components from one or more sensors, and determining, using one or more processors, whether the monitored operating parameters satisfy the pre-conditional parameters. The method further includes, responsive to both receiving an indication to start the selected test and determining that the monitored operating parameters satisfy the pre-conditional parameters, performing the selected test on the one or more engine components.

Optionally, the method further includes displaying a list of multiple tests on the display screen prior to displaying the test details. The selected test is one of the tests in the list. The method further includes receiving an indication of the selected test from the list by an operator using an input device and then displaying the test details for the selected test in response to the received indication. Optionally, the list of multiple tests is a first list displayed in a test window on the display screen. The first list represents individual tests within a common test category. The method further includes displaying a second list in a category window on the display screen. The second list represents multiple test categories.

Optionally, the method further includes, during performance of the selected test, displaying a progress indicator message on the display screen. The progress indicator message describes at least one of a current stage of the test or current activity of the one or more engine components.

Optionally, the method further includes providing at least one of a visual or an audible alert for an operator responsive to receiving the indication to start the selected test when the measured operating parameters do not satisfy the pre-conditional parameters. The selected test is not performed until all of the pre-conditional parameters are satisfied.

Optionally, the test details are presented on a computational functional display on the display screen.

Optionally, performing the selected test includes adjusting operational settings of the one or more engine components according to instructions stored in a test plan of the selected test.

In another embodiment, a tangible and non-transitory computer readable medium is provided that includes one or more computer software modules configured to direct one or more processors to display test details on a display screen. The test details are specific to a selected test for performance on one or more engine components. The test details include pre-conditional parameters of the one or more engine components that are necessary prior to starting the selected test. The one or more computer software modules are also configured to direct one or more processors to receive monitored operating parameters of the one or more engine components from one or more sensors, and to determine whether the measured operating parameters satisfy the pre-conditional parameters. The one or more computer software modules are further configured to direct one or more processors to perform the selected test on the one or more engine components responsive to both receiving an indication to start the selected test and determining that the measured operating parameters satisfy the pre-conditional parameters.

Optionally, the one or more processors are further directed to provide at least one of a visual or an audible alert for an operator responsive to receiving the indication to start the selected test when the monitored operating parameters do not satisfy the pre-conditional parameters.

Optionally, the pre-conditional parameters include one or more of an on/off status, an operating speed, a power consumption level, a communication quality status, or a threshold setting of the one or more engine components.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

What is claimed is:

1. A system comprising:
   one or more sensors configured to monitor operating parameters of one or more engine components; and
   a controller having one or more processors, the controller being operatively connected to the one or more sensors and the one or more engine components, the controller being programmed to perform operations in response to instructions stored on a non-transitory memory to:
   display test details on a display screen, the test details being specific to a selected test for the controller to perform on the one or more engine components, the test details including a plurality of pre-conditional parameters of the one or more engine components that are necessary prior to starting the selected test;
   receive the monitored operating parameters of the one or more engine components from the one or more sensors;
   display the monitored operating parameters that are associated with each of the pre-conditional parameters on the display screen concurrently with the display of each of the pre-conditional parameters of the selected test prior to performing the selected test to allow a visual comparison between each of the pre-conditional parameters and the monitored operating parameters, wherein each of the pre-conditional parameters that is displayed is associated with at least one of the monitored operating parameters that is displayed;
   determine whether the monitored operating parameters satisfy the pre-conditional parameters; and
   responsive to both receiving an indication to start the selected test and determining that the monitored operating parameters satisfy each of the pre-conditional parameters, perform the selected test on the one or more engine components and display the monitored operating parameters that are associated with each of the pre-conditional parameters.

2. The system of claim 1, wherein the controller is programmed to provide at least one of a visual or an audible alert for an operator responsive to receiving the indication to start the selected test when the monitored operating parameters do not satisfy each of the pre-conditional parameters, the controller being programmed to not perform the selected test until all of the pre-conditional parameters are satisfied.

3. The system claim 1, wherein, in response to determining that at least one of the pre-conditional parameters is not satisfied by the monitored operating parameters, the controller is programmed to provide a visual alert on the display screen that indicates the at least one pre-conditional parameter that is not satisfied.

4. The system of claim 1, wherein the controller is further programmed to display a list of multiple tests on the display screen prior to displaying the test details, the selected test being one of the tests in the list, the controller configured to display the test details of the selected test responsive to receiving an indication of the selected test by an operator using an input device.

5. The system of claim 1, wherein the test details include the pre-conditional parameters and projected activity of the one or more engine components that is expected to occur during performance of the selected test, wherein the projected activity of the one or more engine components includes operating adjustments to be made to the one or more engine components during the test.

6. The system of claim 1, further comprising the display screen, wherein the controller and the display screen are disposed in a housing of a device.

7. The system of claim 1, wherein the test details are presented on a computational functional display on the display screen.

8. The system of claim 1, wherein the one or more engine components include one or more of a pump, a turbocharger, a motor, an engine, a generator, or a radiator.

9. A method comprising:
   displaying test details on a display screen, the test details being specific to a selected test for performance on one or more engine components, the test details including a plurality of pre-conditional parameters of the one or more engine components that are necessary prior to starting the selected test;
   receiving monitored operating parameters of the one or more engine components from one or more sensors;
   concurrently displaying each of the pre-conditional parameters and a subset of the monitored operating parameters that are associated with the pre-conditional parameters on the display screen prior to performing the selected test to allow a visual comparison between each of the pre-conditional parameters and the monitored operating parameters, wherein each of the pre-conditional parameters that is displayed is associated with at least one of the monitored operating parameters that is displayed;
   determining, using one or more processors, whether the monitored operating parameters satisfy the pre-conditional parameters; and responsive to both receiving an indication to start the selected test and determining that the monitored operating parameters satisfy each of the pre-conditional parameters, performing the selected test on the one or more engine components and displaying the monitored operating parameters that are associated with each of the pre-conditional parameters.

10. The method of claim 9, further comprising displaying a list of multiple tests on the display screen prior to displaying the test details, the selected test being one of the tests in the list, the method further including receiving an indication of the selected test from the list by an operator using an input device and then displaying the test details for the selected test in response to the received indication.

11. The method of claim 10, wherein the list of multiple tests is a first list displayed in a test window on the display screen, the first list representing individual tests within a common test category, the method further comprising displaying a second list in a category window on the display screen, the second list representing multiple test categories.

12. The method of claim 9, further comprising, during performance of the selected test, displaying a progress indicator message on the display screen, the progress indicator message describing at least one of a current stage of the test or current activity of the one or more engine components.

13. The method of claim 9, further comprising providing at least one of a visual or an audible alert for an operator responsive to receiving the indication to start the selected test when the monitored operating parameters do not satisfy each of the pre-conditional parameters, the selected test not being performed until all of the pre-conditional parameters are satisfied.

14. The method of claim 9, wherein the test details are presented on a computational functional display on the display screen.

15. The method of claim 9, wherein performing the selected test includes adjusting operational settings of the one or more engine components according to instructions stored in a test plan of the selected test.

16. A tangible and non-transitory computer readable medium comprising one or more computer software modules configured to direct one or more processors to:
display test details on a display screen, the test details being specific to a selected test for performance on one or more engine components, the test details including a plurality of pre-conditional parameters of the one or more engine components that are necessary prior to starting the selected test;
receive and display monitored operating parameters of the one or more engine components from one or more sensors, wherein each of the pre-conditional parameters is associated with at least one of the monitored operating parameters;
determine whether the monitored operating parameters satisfy each of the pre-conditional parameters;
responsive to determining that at least one of the pre-conditional parameters is not satisfied by the monitored operating parameters, provide a visual alert on the display screen identifying the at least one pre-conditional parameter that is not satisfied; and
responsive to both receiving an indication to start the selected test and determining that the monitored operating parameters satisfy each of the pre-conditional parameters, perform the selected test on the one or more engine components and display the monitored operating parameters that are associated with each of the pre-conditional parameters.

17. The tangible and non-transitory computer readable medium of claim 16, wherein the one or more processors are further directed to provide at least one of a visual or an audible alert for an operator responsive to receiving the indication to start the selected test when the monitored operating parameters do not satisfy the pre-conditional parameters.

18. The tangible and non-transitory computer readable medium of claim 16, wherein the pre-conditional parameters include one or more of an on/off status, an operating speed, a power consumption level, a communication quality status, or a threshold setting of the one or more engine components.

19. The tangible and non-transitory computer readable medium of claim 16, wherein the one or more processors are further directed to concurrently display each of the pre-conditional parameters and the monitored operating parameters that are associated with each of the pre-conditional parameters on the display screen prior to performing the selected test to allow a visual comparison between the pre-conditional parameters and the monitored operating parameters.

20. The system of claim 1, wherein the controller is programmed to display the monitored operating parameters in an operating parameter window and to display the pre-conditional parameters in a test detail window that is arranged side-by-side with the operating parameter window in a split-screen format.

* * * * *